United States Patent
Jang et al.

(10) Patent No.: US 8,452,902 B2
(45) Date of Patent: May 28, 2013

(54) METHODS FOR TRANSMITTING BUFFER SIZE INFORMATION

(75) Inventors: Kyung Hun Jang, Yongin-si (KR); Sung Ho Choi, Yongin-si (KR); Soeng Hun Kim, Yongin-si (KR); Kyeong-In Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 984 days.

(21) Appl. No.: 11/686,564

(22) Filed: Mar. 15, 2007

(65) Prior Publication Data

US 2008/0120445 A1    May 22, 2008

(30) Foreign Application Priority Data

Nov. 6, 2006  (KR) .......................... 10-2006-108993

(51) Int. Cl.
*G06F 3/00* (2006.01)
*G06F 5/00* (2006.01)

(52) U.S. Cl.
USPC .............................................. 710/52; 710/56

(58) Field of Classification Search
USPC ......................................................... 710/52
See application file for complete search history.

(56) References Cited

U.S. PATENT DOCUMENTS

| | | | | |
|---|---|---|---|---|
| 5,396,595 A * | 3/1995 | Standley | ........................... | 710/68 |
| 6,529,922 B1 | 3/2003 | Hoge | | |
| 7,065,051 B2 * | 6/2006 | Airy et al. | ....................... | 370/236 |
| 2003/0099291 A1 | 5/2003 | Kerofsky | | |
| 2003/0123553 A1 | 7/2003 | Kerofsky | | |
| 2003/0212726 A1 | 11/2003 | Luick | | |
| 2004/0042483 A1 * | 3/2004 | Elzur et al. | ..................... | 370/463 |
| 2005/0047416 A1 | 3/2005 | Heo et al. | | |
| 2005/0083943 A1 | 4/2005 | Lee et al. | | |
| 2007/0257824 A1 * | 11/2007 | Harada et al. | ................... | 341/51 |

FOREIGN PATENT DOCUMENTS

| | | |
|---|---|---|
| JP | 2004-128989 | 4/2004 |
| KR | 1998-070000 | 10/1998 |
| KR | 2003-30133 | 4/2003 |
| KR | 2005-20549 | 3/2005 |
| WO | WO 02/056627 | 7/2002 |
| WO | PCT/KR2007/001299 | 8/2009 |

OTHER PUBLICATIONS

Office Action issued in corresponding Korean Patent Application No. 10-2006-0108993 dated May 29, 2008.

* cited by examiner

*Primary Examiner* — Idriss N Alrobaye
*Assistant Examiner* — Zachary K Huson
(74) *Attorney, Agent, or Firm* — NSIP Law

(57) ABSTRACT

A method of transmitting information about a buffer size includes transmitting a bit string comprising a first bit string and a second bit string when the buffer size is greater than or equal to a first value, the first bit string indicating a quotient which is acquired by dividing the buffer size by a second value, and the second bit string indicating a value corresponding to a remainder which is acquired by dividing the buffer size by the second value.

37 Claims, 4 Drawing Sheets

METHODS FOR TRANSMITTING BUFFER SIZE INFORMATION

CROSS-REFERENCE TO RELATED APPLICATIONS

This application claims the benefit of Korean Patent Application No. 2006-108993, filed on Nov. 6, 2006 in the Korean Intellectual Property Office, the disclosure of which is incorporated herein by reference.

BACKGROUND OF THE INVENTION

1. Field of the Invention

Aspects of the present invention relate to a method of transmitting buffer size information and, more particularly, to a method of precisely transmitting buffer size information without an error.

2. Description of the Related Art

A base station needs to be aware of information about a buffer status of a mobile station in order to transmit data to the mobile station properly. The base station therefore continuously monitors the buffer status of the mobile station. Information about the buffer status includes information about a buffer size of the mobile station. If the base station knows the mobile station's buffer size, the base station can transmit data to the mobile station more effectively. For example, if the mobile station has a small buffer size, the base station may delay transmission of data until the buffer size increases. When the buffer size increases, the base station can transmit the data.

Accordingly, a mobile station continuously transmits buffer size information to the base station. One example of transmitting buffer size information to a base station is the full coding method. The full coding method codes information of the exact (precise) buffer size. In the full coding method, if a buffer has a maximum buffer size of 15,000 bytes, 14 bits are required to transmit the buffer size information. The full coding method requires a comparatively large number of bits to transmit the buffer size information.

Another example of transmitting data to a base station is the logarithmic method. The logarithmic method indicates a buffer size of "A×10$B^B$" according to a first bit string A and a second bit string B. In this instance, the first bit string A indicates a base and the second bit string B indicates an index. However, according to the logarithmic method, as the buffer size increases, the difference between the actual buffer size and a coded buffer size also increases and thus errors become significant. Accordingly, a method of transmitting buffer size information precisely without the introduction of errors is needed.

SUMMARY OF THE INVENTION

Aspects of the present invention provide a method of transmitting buffer size information which can utilize a comparatively small number of bits to transmit buffer size information and also can transmit buffer size information having an insignificant size difference between an actual buffer and a coded buffer even when the buffer size increases.

Other aspects of the present invention provide a method of transmitting buffer size information which can transmit information that indicates a precise buffer size when information about a small buffer size is transmitted and thereby can precisely transmit most frequently transmitted buffer size information.

Additional aspects of the present invention provide a method of transmitting buffer size information in which errors with actual buffer sizes exist when a buffer size increases; however, the errors are insignificant and the error does not increase in proportion to an increase of the buffer size.

According to an aspect of the present invention, there is provided a communication apparatus including a module to transmit a bit string comprising a first bit string and a second bit string, wherein, when a buffer size of the communication apparatus is greater than or equal to a first value, the first bit string indicates a quotient of the buffer size divided by a second value, and the second bit string indicates a value corresponding to a remainder of the buffer size divided by the second value. Also, when the buffer size is less than the first value, the first bit string indicates the exact buffer size and the second bit string is set to a third value.

According to another aspect of the present invention, there is provided a communication apparatus including: a module to transmit a bit string comprising an N bit first bit string and an M bit second bit string, wherein N is the minimum integer for which $2^{2N}-1$ is greater than or equal to a maximum buffer size and M is an integer greater than or equal to 2. Also, when the buffer size of the communication apparatus is greater than or equal to $2^N$, the first bit string indicates a quotient of the buffer size divided by $2^N$ and the second bit string indicates a value corresponding to a remainder of the buffer size divided by $2^N$.

According to another aspect of the present invention, there is provided a communication apparatus comprising an extractor to extract an N bit first bit string and an M bit second bit string from a bit string that includes buffer size information received from another communication apparatus; wherein, when the second bit string is a certain value, the first bit string is interpreted as a buffer size of the other communication apparatus.

According to another aspect of the present invention, the communication apparatus interprets a result value as the buffer size of the other communication apparatus when the second bit string is not the certain value. The result value is acquired by multiplying the first bit string by a first value and summing the result of the multiplication and a remainder determined according to the second bit string.

According to a further aspect of the present invention, there is provided a method of transmitting information about a buffer size, including: transmitting a bit string comprising a first bit string and a second bit string when the buffer size is greater than or equal to a first value, the first bit string indicating a quotient of the buffer size divided by a second value and the second bit string indicating a value corresponding to a remainder of the buffer size divided by the second value. In this instance, when the buffer size is less than the first value, the first bit string precisely indicates the buffer size and the second bit string is set to a third value.

According to another aspect of the present invention, there is provided a method of transmitting information about a buffer size, the method including: transmitting a bit string comprising an N bit first bit string and an M bit second bit string, N being the minimum integer for which $2^{2N}-1$ is greater than or equal to a maximum buffer size and M being an integer greater than or equal to 2. In this instance, when the buffer size is greater than or equal to $2^N$, the first bit string indicates a quotient of the buffer size divided by $2^N$ and the second bit string indicates a value corresponding to a remainder of the buffer size divided by $2^N$.

According to another aspect of the present invention, there is provided a method of receiving buffer size information, the method including: receiving the buffer size information from a communication apparatus; extracting an N bit first bit string and an M bit second bit string from a bit string included in the buffer size information; and interpreting the first bit string as a buffer size of the communication apparatus when the second bit string is a third value.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
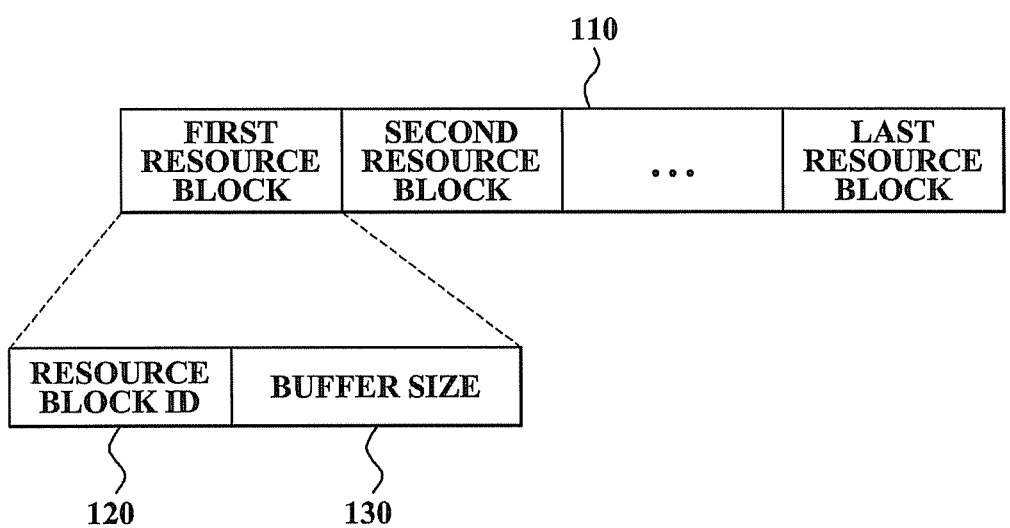
FIG. 1 is a diagram illustrating a buffer status report according to an embodiment of the present invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures. As used herein, the term "quotient" refers to the integral portion of the result of dividing two integers.

FIG. 1 is a diagram illustrating a buffer status report according to an embodiment of the present invention. A buffer size indicates an available space size in a buffer. A maximum buffer size indicates a physical size of the buffer, the maximum amount of data that can be stored in the buffer. For example, a maximum buffer size of a buffer having a physical size of 16,384 bytes ($2^{14}$ bytes) is 16,384 bytes. When 11,000 bytes of the buffer is being used, i.e., when 11,000 bytes of data is stored in the buffer, the buffer size becomes 5,384 bytes. Accordingly, a mobile station should report a buffer size of the mobile station to a base station so that the base station may allocate resources to the mobile station appropriately.

The mobile station may include a plurality of buffers or may maintain a single buffer corresponding to each service type. For example, the mobile station may maintain a buffer for real-time data, a buffer for lossless data, and the like. Accordingly, the mobile station should report the buffer size for each of the plurality of buffers to the base station.

According to an embodiment of the present invention, a mobile station transmits a buffer status report 110 to a base station. The buffer status report 110 includes a plurality of resource blocks. The plurality of resource blocks corresponds to a plurality of buffers of the mobile station respectively. As shown in FIG. 1, a single resource block includes a resource block identifier (ID) 120 and a field 130 for a buffer size. In this example, the resource block ID 120 indicates a buffer of the mobile station and the corresponding resource block contains information about the respective buffer. The field of the buffer size 130 includes information about the size of a corresponding buffer.

A buffer status report that a mobile station transmits to a base station includes information about a plurality of buffers. Therefore, the fewer bits used to indicate buffer size, the less load on the network the transmission will cause. Since the buffer status report is usually transmitted from the mobile station to the base station continuously, it is desirable to utilize a small number of bits.

Figure 2:
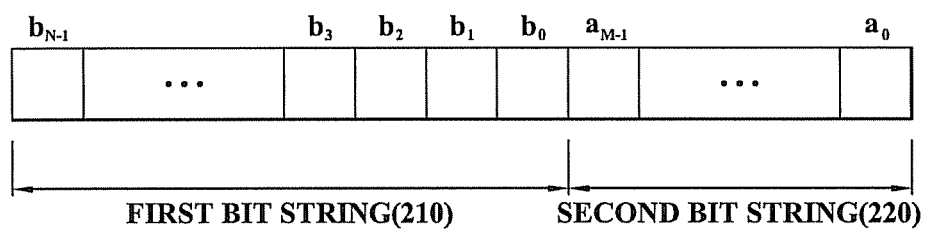
FIG. 2 is a diagram illustrating coding of buffer size information according to an embodiment of the present invention.

FIG. 2 is a diagram illustrating coding of buffer size information according to an embodiment of the present invention. A communication apparatus codes information about a buffer size of the communication apparatus based on a first bit string 210 and a second bit string 220. The first bit string 210 includes N bits, and the second bit string 220 includes M bits. The coded buffer size information is transmitted to another communication apparatus, such as a base station or the like.

In an embodiment of the present invention, N is the minimum integer for which $2^{2^N}-1$ is greater than or equal to a maximum buffer size. For example, when a buffer has a maximum buffer size of 15,000 bytes, 7 is the integer for which $2^{2^N}-1$ is greater than or equal to 15,000. When the buffer has a maximum buffer size of 4,000 bytes, 6 is the integer for which $2^{2^N}-1$ is greater than or equal to 4,000. As described above, the size of a first bit string for buffer coding may be determined from a maximum buffer size.

When the buffer size is less than a first value, the first bit string 210 indicates the precise buffer size and the second bit string 220 is set to a third value. When the first bit string 210 includes N bits, the first value may be set to $2^N$. When the buffer size is less than $2^N$, the exact buffer size may be indicated by the first bit string 210. The second bit string 220 may be set to, for example, zero. Thus, when the buffer size is less than $2^N$, the first bit string 210 indicates the exact value of the buffer size and the second bit string 220 is set to zero (or another predetermined value).

When the buffer size is greater than or equal to the first value, the first bit string 210 indicates quotient of the buffer size divided by a second value and the second bit string 220 indicates a value corresponding to the remainder. In this instance, the second bit string 220 has a value other than the third value. For example, when a buffer size is less than the first value, the second bit string may have a value of zero; when the buffer size is greater than or equal to the first value, the second bit string may have a nonzero value. The second bit string has a size greater than 2 bits to indicate a value corresponding to the remainder of the buffer size divided by a second value. The second bit string corresponds to an integer M greater than or equal to 2.

The first value may be utilized as the second value to divide the buffer size. In the above-described example, when the first value is $2^N$, the second value would also be $2^N$. In this case, when the buffer size is greater than or equal to $2^N$, the first bit string 210 is determined by the quotient of the buffer size divided by $2^N$ and the second bit string 220 is determined by the remainder.

For example, when the second bit string 220 includes 2 bits and the buffer size is less than $2^N$, the second bit string is set to zero. In this case, when the remainder of the buffer size divided by $2^N$ is greater than 0 and less than ⅓ of $2^N$, the second bit string is set to "1". When the remainder $^N$ is between ⅓ of $2^N$ and ⅔ of $2^N$, the second bit string is set to "2". When the remainder is between ⅔ of $2^N$ and $2^N$, the second bit string is set to "3".

As described above, when the buffer size is greater than or equal to the first value, the ranges of values for the corresponding values of the second bit string 220 are nearly identical. Although a difference exists, the difference is less than one. When the buffer size is greater than or equal to the first value, values for the second bit string 220 may be set so that the difference between sizes of the corresponding ranges of remainder values is less than 1. In this instance, the difference between the actual buffer size and the coded buffer size does not increase in proportion to the increase of the buffer size.

Figure 3:
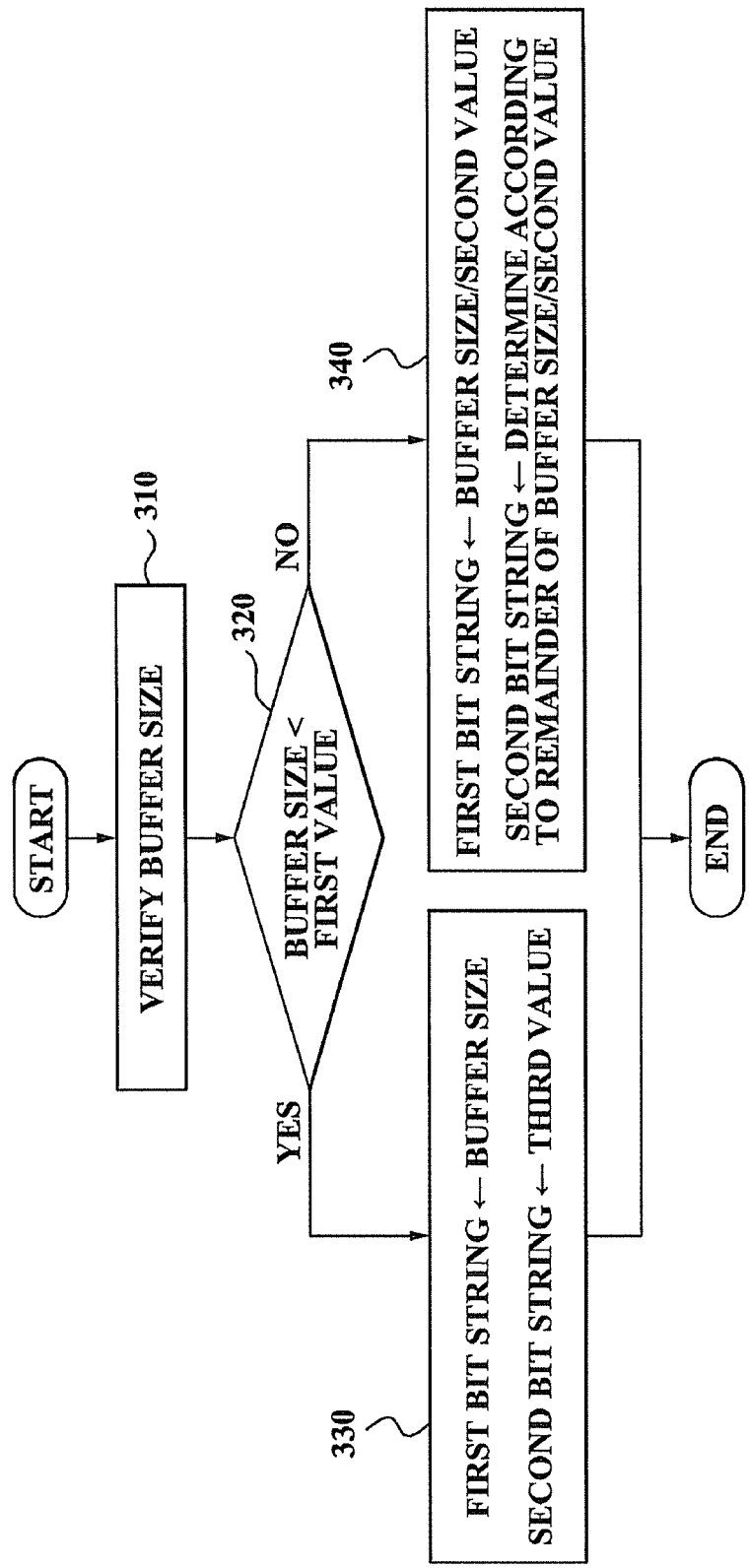
FIG. 3 is a flowchart illustrating a method of coding buffer size information according to an embodiment of the present invention.

FIG. 3 is a flowchart illustrating a technique of coding buffer size information according to an embodiment of the present invention. In operation 310, a communication apparatus verifies a buffer size of the communication apparatus. In operation 320, the communication apparatus compares the buffer size with a first value. According to an embodiment of the present invention, the first value is $2^N$. In this instance, N is the minimum integer for which $2^{2N}-1$ is greater than or equal to the maximum buffer size. In operations 330 and 340, a bit string including a first bit string and a second bit string is generated. The first bit string includes N bits and the second bit string includes M bits. The bit string contains buffer size information.

When the buffer size is determined to be less than the first value in operation 320, the first bit string is set to the precise value of the buffer size and the second bit string is set to a third value in operation 330. In this instance, the second bit string may be set to, for example, zero. When the buffer size is determined to be greater than or equal to the first value in operation 320, the first bit string is set to indicate the quotient of the buffer size divided by a second value and the second bit string is set to indicate a value corresponding to the remainder. In this instance, the value of the second bit string is not set to the third value.

The first value may be utilized for the second value to divide the buffer size. As in the above-described example, when the first value is $2^N$, the second value is also $2^N$. When the buffer size is greater than or equal to $2^N$, the first bit string is determined by the quotient of the buffer size divided by $2^N$ and the second bit string is determined by the remainder. The difference between the sizes of the ranges of remainders corresponding to each value of the second bit string is less than or equal to 1.

Once the bit string is generated in operations 330 and 340, the communication apparatus transmits buffer status information containing the bit string to a base station (not shown).

Figure 4:
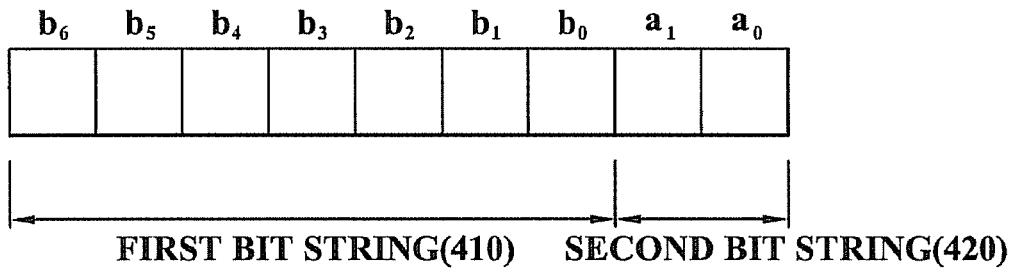
FIG. 4 is a diagram illustrating coding of buffer size information for a buffer that has a maximum buffer size of 15,000 bytes according to an embodiment of the present invention.

FIG. 4 is a diagram illustrating coding of buffer size information for a buffer that has a maximum buffer size of 15,000 bytes according to an exemplary embodiment of the present invention. A first bit string 410 includes N bits and a second bit string 420 includes M bits. In the example illustrated in FIG. 4, N is 7 and M is 2. N is determined by the minimum integer for which $2^{2N}-1$ is greater than or equal to a maximum buffer size. In this example, the maximum buffer size is 12,000 bytes. The minimum integer N for which $2^{2N}-1$ is greater than or equal to 12,000 is seven. Therefore, the size of the first bit string 410 is 7. Among the integers greater than or equal to 2, the value M corresponding to the size of the second bit string 420 is set to two.

When the buffer size is less than $2^7$ (128), the first bit string 410 accurately indicates the buffer size and the second bit string 420 is set to a third value. In this instance, the third value may be zero. (a1, a0) thus becomes (0, 0). When the buffer size is 37 bytes, (b6, b5, b4, b3, b2, b1, b0) becomes (0, 1, 0, 0, 1, 0, 1). When the buffer size is less than 128, information about the buffer size is accurately coded.

When the buffer size is greater than or equal to $2^7$ (128), the first bit string 410 indicates the quotient of the buffer size divided by $2^7$ and the second bit string 420 indicates a value corresponding to the remainder. When the buffer size is 12,000 bytes, 93, the quotient of 12,000 divided by 128, is coded to the first bit string 410. Specifically, (b6, b5, b4, b3, b2, b1, b0) is set to (1, 0, 1, 1, 1, 0, 1). The second bit string 420 is determined according to the remainder. In this instance, "0", which is used when the buffer size is less than 128, is not used. Therefore, the second bit string 420 is 1, 2, or 3, depending on the remainder.

In the example shown in FIG. 4, when the remainder is between 0 and 42, the second bit string 420 becomes "1", i.e., (a1, a0)=(0, 1). When the remainder is between 43 and 84, the second bit string 420 becomes "2", i.e., (a1, a0)=(1, 0). When the remainder is between 85 and 127, the second bit string 420 becomes "3", i.e., (a1, a0)=(1, 1). When the buffer has the size of 12,000 bytes, the remainder of 12,000 divided by 128 is 96. The second bit string 420 therefore becomes "3", i.e., (a1, a0)=(1, 1).

The difference between the sizes of the ranges of remainders corresponding to each value of the second bit string 420 is less than or equal to 1. In the example illustrated in FIG. 4, the range of possible remainders is 43 when the second bit string 420 has a value of 1, the range of possible remainders is 42 when the second bit string 420 has a value of 2, and the range of possible remainders is 43 when the second bit string 420 has a value of 3. As can be seen, the difference between the sizes of the ranges of possible remainders is at most 1. Since remainder values are almost regularly allocated, a size error between a coded buffer and an actual buffer does not significantly increase even when the buffer size increases.

According to the embodiment illustrated in FIG. 4, when an intermediate value is selected from remainder values which are allocated according to a value of the second bit string 420, an error will be within only 21 bytes even when the buffer size increases. In the example given above, when the first bit string 410 is 93 and the second bit string 420 is 3, the base station interprets a buffer size of the mobile station that transmitted the coded buffer size information as "93×128+ 106"="12,010" based on the coded buffer size information. In this instance, "106" is an intermediate value among values from 85 to 127 when the second bit string 420 corresponds to 3. In this example the error between the actual buffer size (12,000 bytes) and the coded byte size (12,010) is only 10 bytes.

Figure 5:
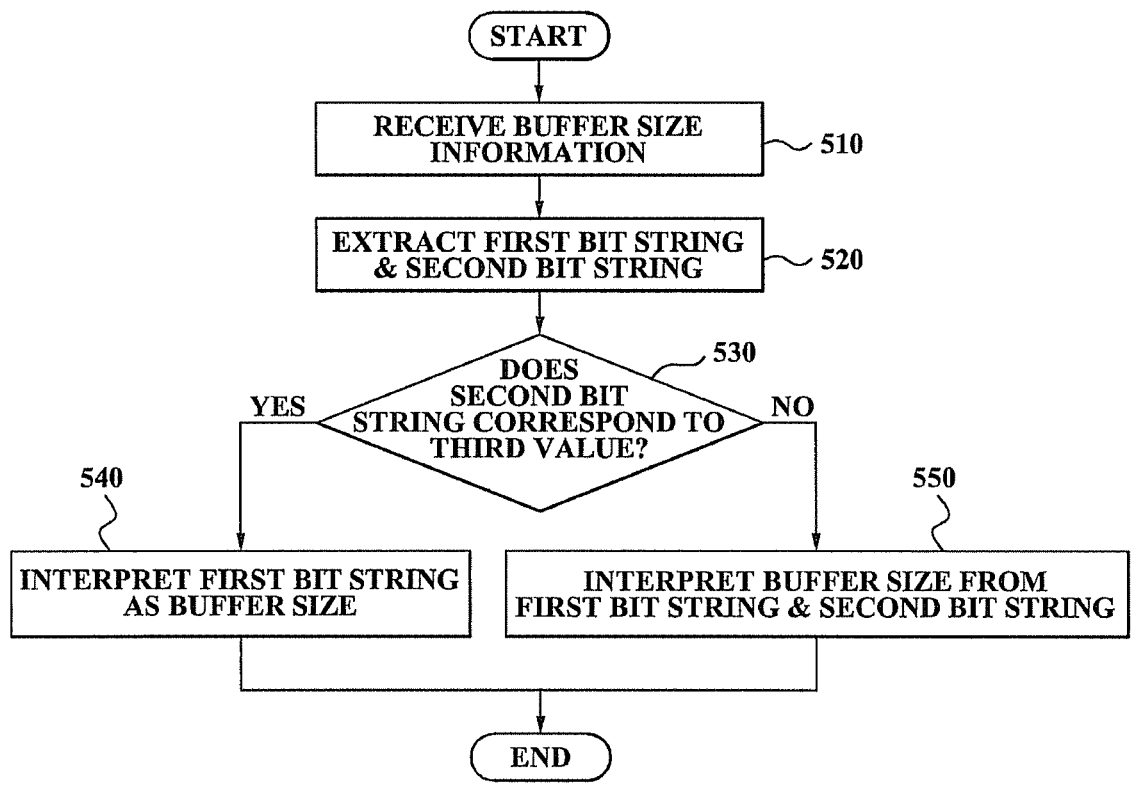
FIG. 5 is a flowchart illustrating a method of receiving coded buffer size information and interpreting the same according to an embodiment of the present invention.

FIG. 5 is a flowchart of a technique of receiving coded buffer size information and interpreting the same according to an embodiment of the present invention. In operation 510, a base station receives buffer size information from a mobile station. In operation 520, the base station extracts an N bit first bit string and an M bit second bit string from a bit string included in the received buffer size information. In the example illustrated in FIG. 4, the base station extracts a top 7 bits from the received bit string and interprets the extracted top 7 bits as the first bit string 410. The base station extracts a bottom 2 bits from the received bit string and interprets the extracted bottom 2 bits as the second bit string 420.

In operation 530, the base station determines whether the second bit string corresponds to a third value, such as zero. When the second bit string is determined to be the third value in operation 530, the base station interprets the first bit string in operation 540 as the buffer size of the mobile station in operation 540. As an example, in the embodiment of FIG. 4, when (a1, a0)=(0, 0) and (b6, b5, b4, b3, b2, b1, b0)=(0, 1, 0, 0, 1, 0, 1), the base station interprets the buffer size of the mobile station as 37 bytes from the first bit string. Conversely, when the second bit string is determined not to be the third value in operation 530, the base station acquires a result value in operation 550 by multiplying the first bit string by a first value, for example, "128", and summing the result of the multiplication and a remainder value determined according to the second bit string and interprets the result value as the buffer size of the communication apparatus.

The received first bit string (b6, b5, b4, b3, b2, b1, b0)=(1, 0, 1, 1, 1, 0, 1) and second bit string (a1, a0)=(1, 1) will be described with reference to FIG. 4. In an embodiment of the present invention, an intermediate value, among values from 85 to 127 when the second bit string corresponds to 3, corresponds to the predetermined remainder value. Therefore, the base station interprets the buffer size of the mobile station as 12,010 bytes from "93×128+106"="12,010".

Aspects of the present invention may be embodied in computer-readable media including program instructions to implement various operations performed by a computer. The media may also include, alone or in combination with the program instructions, data files, data structures, and the like. Examples of computer-readable recording media for storing programs include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Other media may be a computer data signal embodied in a carrier wave comprising a compression source code segment and an encryption source code segment (such as data transmission through the Internet). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 6:
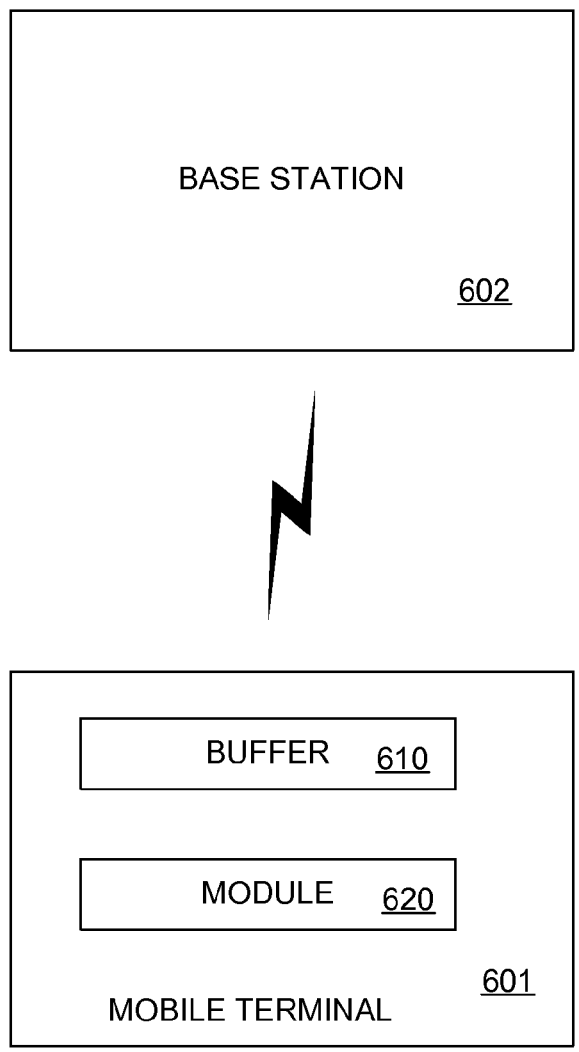
FIG. 6 is an example of a communications system for coding buffer size information.

FIG. 6 is an example of a communications system for coding buffer size information. The system includes a first communication 601 device and a second communication device 602. The first communication device may include a buffer 610 and a module 620. The module may perform the operations described above including coding the buffer size information. The first communications device may be a mobile station and the second communications device may be a base station.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A communication apparatus including a buffer, the communication apparatus comprising:
a device to transmit a bit string comprising a first bit string and a second bit string,
wherein, when a buffer size of the communication apparatus is greater than or equal to a first value, the first bit string indicates a quotient of the buffer size divided by a second value and the second bit string indicates a value corresponding to a remainder of the buffer size divided by the second value, and when the buffer size is less than the first value, the first bit string indicates an exact buffer size and the second bit string is set to a third value.

2. The communication apparatus of claim 1, wherein, when the buffer size is greater than or equal to the first value, the second bit string is not set to the third value.

3. The communication apparatus of claim 2, wherein the first bit string comprises N bits and the first value is $2^N$.

4. The communication apparatus of claim 3, wherein the second bit string comprises M bits and M is an integer greater than or equal to 2.

5. The communication apparatus of claim 4, wherein, when the buffer size is greater than or equal to the first value, the ranges of values corresponding to each value of the second bit string are nearly identical.

6. The communication apparatus of claim 1, wherein the first bit string comprises N bits and the first value is $2^N$.

7. The communication apparatus of claim 6, wherein N is the minimum integer for which $2^2N-1$ is greater than or equal to a maximum buffer size.

8. The communication apparatus of claim 6, wherein N is 7.

9. The communication apparatus of claim 1, wherein the second bit string comprises M bits and M is an integer greater than or equal to 2.

10. The communication apparatus of claim 1, wherein the second value is identical to the first value.

11. The communication apparatus of claim 10, wherein the first bit string comprises N bits and the second value is $2^N$.

12. A communication apparatus including a buffer, the communication apparatus comprising:
a device to transmit a bit string comprising an N bit first bit string and an M bit second bit string,
wherein N is the minimum integer for which $2^2N-1$ is greater than or equal to a maximum buffer size and M is an integer greater than or equal to 2.

13. The communication apparatus of claim 12, wherein:
the first bit string indicates a quotient of the buffer size divided by $2^N$; and
the second bit string indicates a value corresponding to a remainder of the buffer size divided by $2^N$, when the buffer size of the communication apparatus is greater than or equal to $2^N$.

14. The communication apparatus of claim 13, wherein, when the buffer size is greater than or equal to $2^N$, a difference between sizes of ranges of remainders corresponding to each value of the second bit string is less than or equal to 1.

15. The communication apparatus of claim 12, wherein, when the buffer size is less than $2^N$, the first bit string precisely indicates the buffer size and the second string is set to a third value.

16. The communication apparatus of claim 15, wherein, when the buffer size is greater than or equal to $2^N$, the second bit string is not the third value.

17. A communication apparatus comprising:
a storage device; and
an extractor to extract an N bit first bit string and an M bit second bit string from a bit string that includes buffer size information received from another communication apparatus including a buffer, the buffer size information indicating the available space in the buffer from among the maximum amount of space of the buffer,
wherein the first bit string is interpreted as a buffer size of the other communication apparatus or a quotient of the buffer size of the other communication apparatus, based on the second bit string.

18. The communication apparatus of claim 17, wherein, when the second bit string indicates that the first bit string is the quotient of the buffer size of the other communication apparatus, the buffer size is acquired by multiplying the first bit string by a first value and summing the result of the multiplication and a value determined according to the second bit string.

19. The communication apparatus of claim 18, wherein the first value is $2^N$.

20. A method of transmitting information about a buffer size of a buffer included in an apparatus, the method comprising:
   transmitting a bit string comprising a first bit string and a second bit string when the buffer size is greater than or equal to a first value, the first bit string indicating a quotient of the buffer size divided by a second value and the second bit string indicating a value corresponding to a remainder of the buffer size divided by the second value.

21. The method of claim 20, wherein, when the buffer size is less than the first value, the first bit string precisely indicates the buffer size and the second bit string is set to a third value.

22. The method of claim 21, wherein, when the buffer size is greater than or equal to the first value, the second bit string is not set to the third value.

23. The method of claim 20, wherein the first bit string comprises N bits and the first value is $2^N$.

24. The method of claim 23, wherein N is the minimum integer for which $2^{2N}-1$ is greater than or equal to a maximum buffer size.

25. The method of claim 20, wherein the second bit string comprises M bits and M is an integer greater than or equal to 2.

26. The method of claim 25, wherein the first bit string comprises N bits and the first value and the second value are $2^N$.

27. A method of transmitting information about a buffer size of a buffer included in an apparatus, the method comprising:
   transmitting a bit string comprising an N bit first bit string and an M bit second bit string, N being the minimum integer for which $2^2N-1$ is greater than or equal to a maximum buffer size, and M being an integer greater than or equal to 2.

28. The method of claim 27, wherein, when the buffer size is greater than or equal to $2^N$, the first bit string indicates a quotient of the buffer size divided by $2^N$ and the second bit string indicates a value corresponding to a remainder of the buffer size divided by $2^N$.

29. The method of claim 28, wherein, when the buffer size is greater than or equal to $2^N$, a difference between sizes of ranges of remainder values corresponding to each value of the second bit string is less than or equal to 1.

30. The method of claim 27, wherein, when the buffer size is less than $2^N$, the first bit string precisely indicates the buffer size and the second string is set to a third value.

31. The method of claim 30, wherein, when the buffer size is greater than or equal to $2^N$, the second bit string is not set to the third value.

32. A method of receiving buffer size information, the method comprising:
   receiving buffer size information from a communication apparatus including a buffer, the buffer size information indicating the available space in the buffer from among the maximum amount of space of the buffer;
   extracting an N bit first bit string and an M bit second bit string from a bit string included in the buffer size information; and
   interpreting the first bit string as a buffer size of the communication apparatus or a quotient of the buffer size of the communication apparatus, based on the second bit string.

33. The method of claim 32, further comprising, when the second bit string indicates the first bit string is the quotient of the buffer size of the communication apparatus:
   acquiring a result value by multiplying the first bit string by a first value and summing the result of the multiplication and a second value determined according to the second bit string; and
   interpreting the result value as the buffer size of the communication apparatus.

34. The method of claim 33, wherein the first value is $2^N$.

35. A non-transitory computer readable recording medium storing a program for transmitting information about a buffer size of an apparatus including instructions to cause a computer to:
   transmit a bit string comprising a first bit string and a second bit string, wherein when the buffer size of the apparatus is greater than or equal to a first value, the first bit string indicates a quotient of the buffer size divided by a second value and the second bit string indicates a value corresponding to a remainder of the buffer size divided by the second value, and when the buffer size is less than the first value, the first bit string indicates the exact buffer size and the second bit string is set to a third value.

36. A method of transmitting a buffer size of a buffer included in a mobile terminal, the method comprising:
   transmitting a buffer status report comprising a plurality of resource blocks, wherein each resource block includes a resource block ID and buffer size information of a respective buffer included in the mobile terminal;
   wherein the buffer size information comprises a bit string, the buffer size information indicates the available space in the respective buffer from among the maximum amount of space of the respective buffer, and the error of the approximation does not increase in proportion to an increase in the buffer size, and
   wherein the bit string comprises a first bit string and a second bit string, the first bit string being interpreted as a buffer size of the respective buffer or a quotient of the buffer size of the respective buffer, based on the second bit string.

37. A method of transmitting a buffer size, the method comprising:
   transmitting a bit string corresponding to a size of a buffer of a mobile terminal,
   wherein the bit string includes a plurality of resource blocks and each resource block includes a resource block ID and buffer size information of a respective buffer of the mobile terminal, the buffer size information indicates the available space in the respective buffer from among the maximum amount of space of the respective buffer, and the error of the approximation does not increase in proportion to an increase in the buffer size, and
   wherein the buffer size information comprises a first bit string and a second bit string, the first bit string being interpreted as a buffer size of the respective buffer or a quotient of the buffer size of the respective buffer, based on the second bit string.

* * * * *